US010533918B2

(12) United States Patent
Masson et al.

(10) Patent No.: US 10,533,918 B2
(45) Date of Patent: Jan. 14, 2020

(54) PROCESS FOR LEAK DETECTION IN CATALYST PRODUCTION

(71) Applicant: UMICORE AG & CO. KG, Hanau-Wolfgang (DE)

(72) Inventors: Stéphane Masson, Village Neuf (FR); Joachim Geiser, Schopfheim (DE); Wolfgang Hasselmann, Rheinfelden (DE)

(73) Assignee: UMICORE AG & CO. KG, Hanau-Wolfgang (DE)

( * ) Notice: Subject to any disclaimer, the term of this patent is extended or adjusted under 35 U.S.C. 154(b) by 82 days.

(21) Appl. No.: 15/534,763

(22) PCT Filed: Dec. 11, 2014

(86) PCT No.: PCT/EP2014/077413
§ 371 (c)(1),
(2) Date: Jun. 9, 2017

(87) PCT Pub. No.: WO2016/091315
PCT Pub. Date: Jun. 16, 2016

(65) Prior Publication Data
US 2017/0356823 A1    Dec. 14, 2017

(51) Int. Cl.
*G01M 3/32* (2006.01)
*B05C 11/10* (2006.01)
(Continued)

(52) U.S. Cl.
CPC ........... *G01M 3/3245* (2013.01); *B01J 35/04* (2013.01); *B01J 37/0215* (2013.01); *B05B 13/06* (2013.01);
(Continued)

(58) Field of Classification Search
CPC ....... B01J 35/04; B01J 37/0215; B05B 13/06; B05C 11/101; B05C 7/04; B05D 7/00;
(Continued)

(56) References Cited

U.S. PATENT DOCUMENTS 4,329,162 A    5/1982 Pitcher, Jr.
4,813,285 A    3/1989 Brown et al.
(Continued)

FOREIGN PATENT DOCUMENTS

CN    102753267    10/2012
CN    103479313    1/2014
(Continued)

OTHER PUBLICATIONS

International Search Report dated Sep. 11, 2015 for PCT/EP2014/077413 (2 pages).
(Continued)

*Primary Examiner* — Randy W Gibson
*Assistant Examiner* — Gedeon M Kidanu
(74) *Attorney, Agent, or Firm* — Smith, Gambrell & Russell, LLP (57) ABSTRACT

The present invention is directed to a process, which can be used in the production of exhaust catalysts. In particular, the present process describes way of testing the leak-tightness of the coating equipment before a new coating campaign begins or during a running campaign.

15 Claims, 4 Drawing Sheets

(51) Int. Cl.
*F01N 11/00* (2006.01)
*B05D 7/00* (2006.01)
*B05B 13/06* (2006.01)
*B05C 7/04* (2006.01)
*F01N 3/28* (2006.01)
*B01J 35/04* (2006.01)
*B01J 37/02* (2006.01)
*F01N 3/10* (2006.01)

(52) U.S. Cl.
CPC .............. *B05C 7/04* (2013.01); *B05C 11/101* (2013.01); *B05D 7/00* (2013.01); *F01N 3/10* (2013.01); *F01N 3/2828* (2013.01); *F01N 11/00* (2013.01); *F01N 2330/04* (2013.01)

(58) Field of Classification Search
CPC ........ F01N 11/00; F01N 2330/04; F01N 3/08; F01N 3/10; F01N 3/2828; G01M 3/3245; Y02T 10/47
See application file for complete search history.

(56) References Cited

U.S. PATENT DOCUMENTS

| | | | | |
|---|---|---|---|---|
| 4,827,762 | A | 5/1989 | Hasselmann | |
| 2012/0315381 | A1* | 12/2012 | Mergner | ............... F01N 3/2828 427/8 |
| 2012/0321537 | A1* | 12/2012 | Mergner | ........... B01D 53/9472 423/212 |

FOREIGN PATENT DOCUMENTS

| | | |
|---|---|---|
| CN | 203764476 U | 8/2014 |
| DE | 102010007499 A1 | 8/2011 |
| DE | 102010008700 A1 | 8/2011 |
| EP | 2921230 A1 | 9/2015 |

OTHER PUBLICATIONS

Written Opinion of the International Search Authority for PCT/EP2014/077413 dated Sep. 11, 2016 (6 pages).

Microsemi. Microwave Sensor Technology. 2008. pp. 1-15. http://www.microsemi.com/document-portal/doc_view/14818-microwave-sensor-technology (accessed Jun. 6, 2017).

Baxter, L. K.Capacitive Sensors, 2000. pp. 1-17. http://www.capsense.com/capsense-wp.pdf (accessed Jun. 6, 2017).

National Instruments. Vibration Sensor Guide. 2010. pp. 1-3. http://www.ni.com/pdf/products/us/cat_vibrationsensor.pdf (accessed Jun. 6, 2017).

Third Office Action received in Chinese Patent Application No. 201480083945.2 dated Jul. 26, 2019 (6 pages in Chinese with English translation).

Second Office Action received in Chinese Patent Application No. 201480083945.2 dated Jun. 4, 2019 (4 pages in Chinese with English translation).

Supplemental Search Report received in Chinese Patent Application No. 201480083945.2 dated Jun. 4, 2019 (1 pages).

* cited by examiner

PROCESS FOR LEAK DETECTION IN CATALYST PRODUCTION

The present invention is directed to a process, which can be used in the production of exhaust catalysts. In particular, the present process describes a way of testing the leak-tightness of the coating equipment before a new coating campaign begins or during a running campaign.

It is well known in the field of combustion engines that fuel combustion is not complete and yields emissions of pollutants like unburned hydrocarbons (HC), carbon monoxide (CO), nitrogen oxides ($NO_x$) and particulate matter (PM). In order to improve air quality, emission limit legislations are in place to achieve lower emissions of pollutants from stationary applications and from mobile sources. For mobile sources like passenger cars, already primary measures enabled achieving a decrease in the emission of pollutants. E.g., improvement of fuel-air mixing as primary measure yielded considerable diminution of pollutants. However, due to more stringent legislations which having been introduced over the years the use of heterogeneous catalysts as secondary measures has become inevitable.

An important aspect of producing these heterogeneous catalysts is the precise coating of substrates used in view of, e.g. coating length, coating quantity applied, evenness of coating layer, uniformity of coating length and coating gradients along the longitudinal axis. In order to achieve this, up to now several coating strategies have been employed that try to provide well-coated monolithic bodies, advantageously in as few time as possible.

One possibility for coating substrates is to bring the openings on one side thereof into contact with the coating medium and to draw the liquid coating medium through the openings, e.g. channels, of a substrate by applying a vacuum to the opposite side of the substrate. If the intention is to coat the channels on only part of the length thereof, it is disadvantageous that different channels are coated over different lengths due to the inevitably individual flow profile which would arise from channel to channel, and which leads to undefined conversion of exhaust pollutants.

If the coating medium is forced into the channels by pressure against the force of gravity, there is then a need to check (generally by means of a sensor) when the liquid emerges at the top in the case of complete coating of the channels. In the case of coating over part of the length of the channels, the height of the liquid column of coating medium within the channels is usually determined by direct or indirect measurement, e.g. through sensors (capacity sensor; visual sensor; IR-sensor; vibrational sensor). However, also in this case an inhomogeneous coating front within the channels of a monolith can result, e.g. if coating is started with an uneven slurry surface formed in the coating chamber below the monolith. The latter occurs, in particular, if fast coating speeds are applied and coating slurry tends to get turbulent while being pumped into the coating chamber within a short timeframe.

If no direct measurement of the coating height in the substrate is performed (i.e. no respective sensors installed) a further effect which may lead to odd coating results is when at the onset of each coating event the washcoat height in the coating chamber is deviating from the standard level. This may be the case, e.g., if either the valve responsible for filling or emptying the coating chamber (FIG. 1 referral (115)) is not leak-tight or a suction flap (FIG. 4 referral 440) through which the washcoat may be sucked out of a coating chamber after the coating event took place is not closed correctly. With regard to coating concrete zones within a carrier both aspects will result in coating levels in the respective substrate which are more prone to fall out of specification.

An object of the present invention is to provide for a process, which dispenses with the drawback mentioned above. In particular, the present process is to serve for a better accuracy in washcoating zones within a carrier or substrate. Preferably, the present process achieves to result in less zone-coated parts falling out of specification.

In that a process for leak detection in a device (122) used for the production of automotive exhaust catalysts, the device (122) comprising a coating chamber (127) in which at least two sensors (123, 126) for measuring the height of the washcoat (130) are positioned at different levels within the coating chamber (127) and being connected to a controlling unit (125), comprises the steps of:

a) introducing washcoat (113), e.g. from below, into the coating chamber (127) up to a fixed level (130) between the lower (126) and the upper sensor (123);

b) waiting at least 5 s; and c) analyzing whether the controlling unit (125) signals that the washcoat level (130) continues to increase and touches the upper sensor (123) or signals if the contact to lower sensor (126) is lost;

an easy way of protecting against false results in zone coating has been found. Due to the fact that at least two sensors (123, 126) are positioned at different levels in the coating chamber (127) the possibility arises that the washcoat front in the coating chamber (127) can be adjusted more precisely. In analyzing if this front moves with the time either toward upper sensor (123) or toward lower sensor (126) indicates whether a leak exists in the valve (115) positioned in the filling pipe or in the suction units (FIG. 5 numeral (440)) connected to the coating chamber for drawing off washcoat.

The present process of improving the accuracy in coating substrates is applied in a coating device which comprises a coating chamber (127) that is equipped with at least two sensors (123, 126) at different levels. After the washcoat (113) has been introduced into the coating chamber (127) in such a way, that the washcoat surfaces lies between mentioned sensors (130), it is a necessary step to wait for a while, e.g. for 5 s or more, in order to monitor whether a leak exists in the washcoat supplying or in the discharging units. It has been found that in a more preferred way the time for waiting shall be more than 10 s but below 30 s, preferably below 20 s. This gives enough time to analyze the stability of the washcoat front for a proper zone-coating of the monoliths engaged in present process.

The above mentioned probes or sensors (123, 126) can be made according to the knowledge of the skilled worker. In the introductory part of this application already several types of sensors have been mentioned that are able to detect whether the surface of the washcoat has passed or not. In particular useful for the present process are sensors selected from the group of capacitive, vibrational, conductive, microwave sensors. Preferred sensors of this type are known and commercially available (http://www.microsemi.com/document-portal/doc_view/14818-microwave-sensor-technology, http://www.microsemi.com/document-portal/doc_view/14818-microwave-sensor-technology, http://www.capsense.com/capsense-wp.pdf, http://www.ni.com/pdf/products/us/cat_vibrationsensor.pdf).

As already indicated the coating chamber (127) is equipped with at least two sensors (123, 126) positioned at different levels for measuring the washcoat height (130) in the chamber (127). In order to analyze this height in the coating chamber precisely enough the sensors (123) and (126) are positioned at a level distance from 20-1 mm, preferably 10-1 mm, and most preferably 4-2 mm. This measure results in the most advantageous fact that the occurrence of a new contact with the upper sensors (123) or the lost contact with the lower sensor (126) indicates a leak and also indicates how big this leakage is. A rather big leakage will result in an early signaling of either the upper (123) or the lower sensor (126). Hence, the analysis of the time lapsed before indicating that a leakage exists serves to somehow predict the magnitude of the leakage involved which might also be a versatile information.

The present invention can be performed advantageously before and preferably immediately before a new production campaign for zone-coated monoliths is started. The present process as part of a bigger process for the production of exhaust catalysts—when applied—furnishes less coated monoliths (121) falling out of the specification, in particular and especially when precise zones of catalytically active washcoat within the monolith (121) have to be created.

It could happen during the campaign that a leakage occurs. In order to be protected against this risk, not only before a new production campaign is initiated but also during a running campaign, the process of the present invention is performed at least once. Hence, the present inventive process can advantageously be performed also during such a production campaign after certain intervals of normally coated monoliths in order to check if the valves and flaps for submitting and drawing off the washcoat are still leak-tight enough to produce well coated parts that most probably meet the specification. E.g. the present process can be accomplished advantageously once after coating of 500-10 000 parts or more. Preferably the process of the invention is started once after coating of 1000-3000 carriers/monoliths or substrates. It has to be mentioned that this process can be implemented into the controlling unit (125) in such a way that automatically the process for checking leak-tightness is initiated after above mentioned intervals.

For performing the coating process of the present invention it is referred to the disclosure DE102010007499A1, which is incorporated herein at least in view of the aspects directed to the device features. In particular, the preferred characteristics of the process mentioned in DE102010007499A1 apply mutatis mutandis also to the process of present invention.

Figure 1:
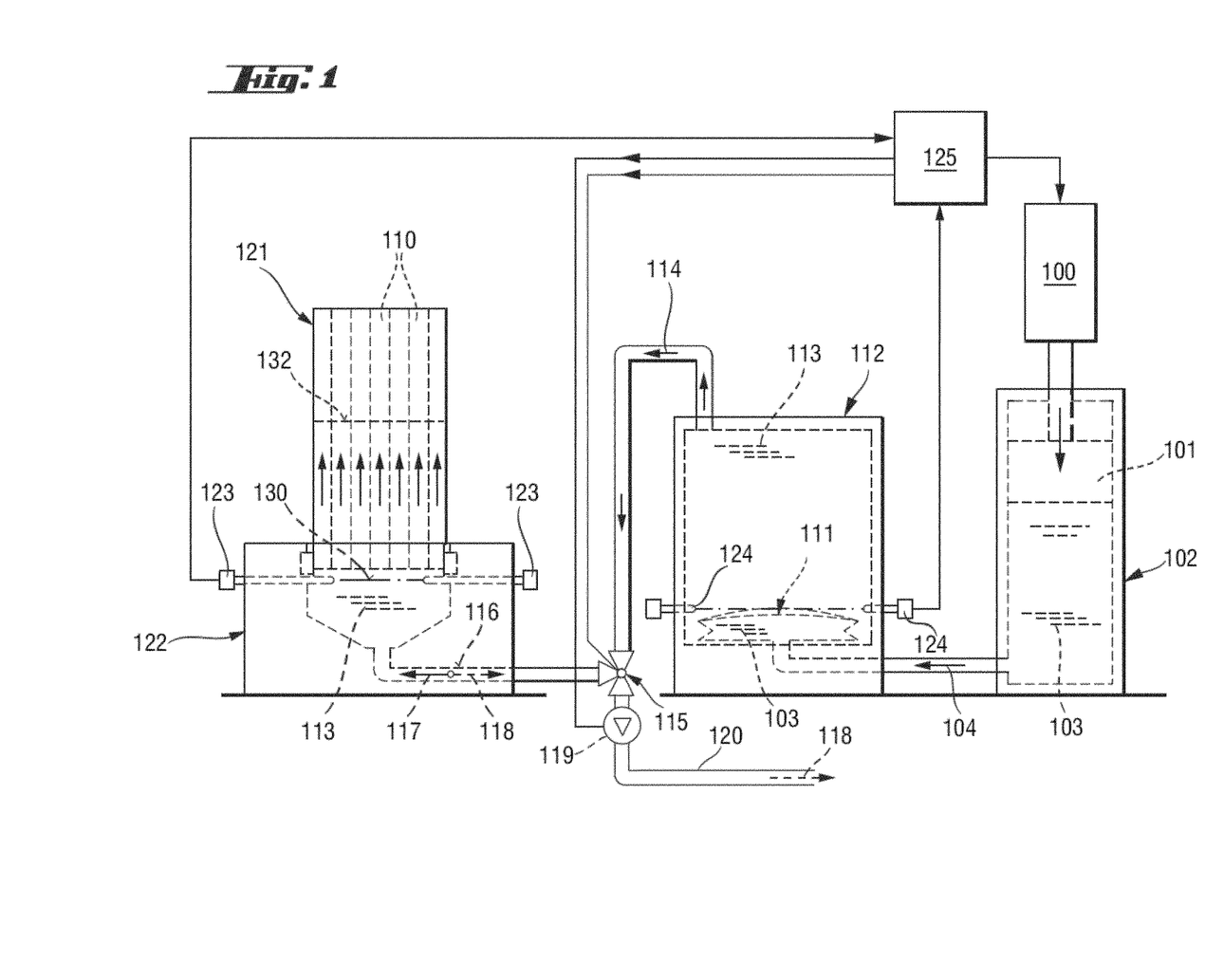
FIG. 1 (example of prior art for coating a carrier):
100 actuator
101 piston
102 cylinder
103 liquid
104 connection
110 channels—in the substrate 121
Figure 2:
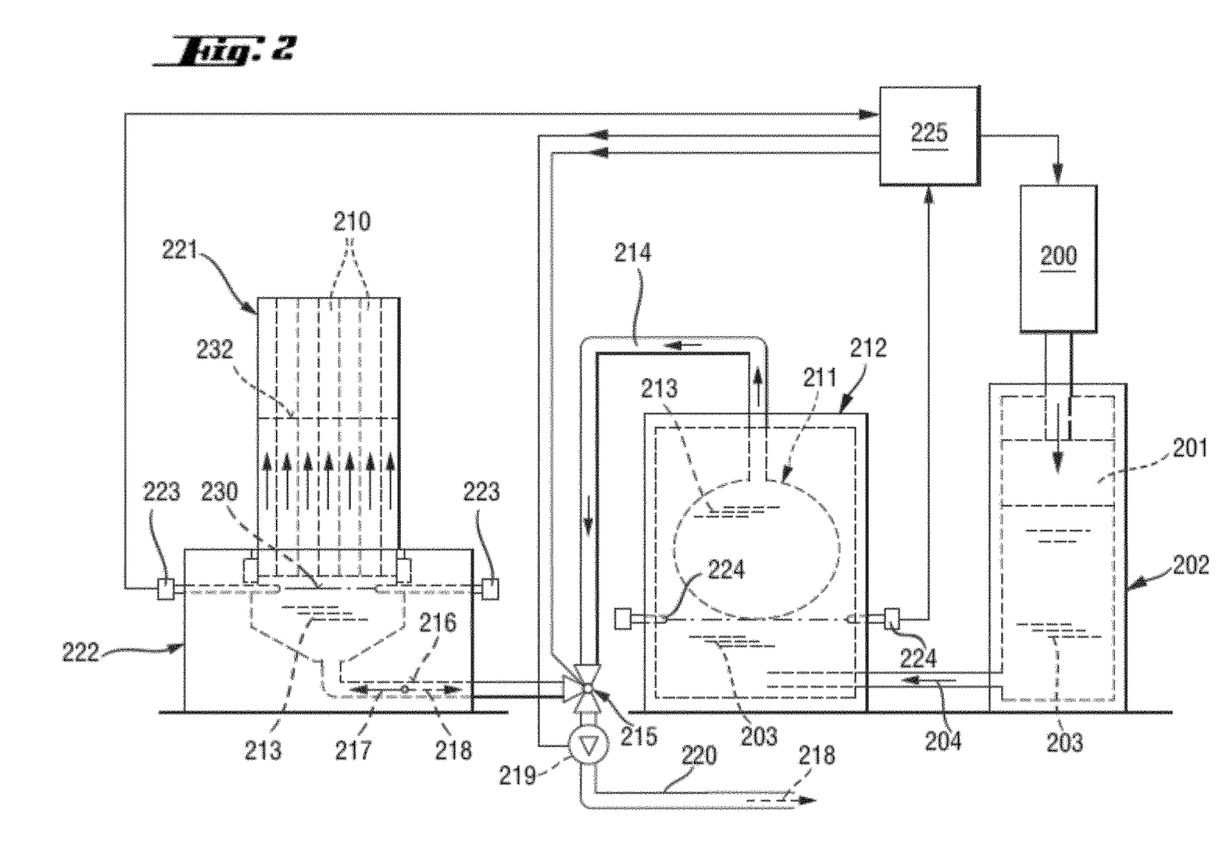

It is likewise noted that references made herein to FIG. 1 are deemed to be made to FIG. 2 accordingly for the same aspect. It has to be noted though that FIG. 2 is different from FIG. 1 in that deflation and inflation of the displacement body (111) or (211) are anticyclic. Hence, when viewing at an embodiment according to FIG. 2 "deflation" has to be exchanged for "inflation". Other aspects may receive a similar interpretation according to the above said.

The substrates that could be taken for the present coating process are known to the skilled worker. Preferably the substrate to be coated according to the invention is a so called wall-flow filter or a flow-through monolith (the synonyms substrate, carrier, monolith, part or body may be used equally throughout the text). The substrates used here may be made of those materials typically used for preparing catalysts, and will preferably comprise a ceramic or metallic honeycomb structure.

Suitable substrates that can be employed are monolithic substrates of the type having fine, parallel gas flow passages extending there through from an inlet or an outlet face of the substrate, such that passages are open to fluid flow there through, named honeycomb flow-through substrates. The passages, which are essentially straight paths from their fluid inlet to their fluid outlet, are defined by walls on which or in which the catalytic material is coated as a washcoat so that the gases flowing through the passages contact the catalytic material. The flow passages of the monolithic substrate are thin-walled channels, which can be of any suitable cross-sectional shape and size such as trapezoidal, rectangular, square, sinusoidal, hexagonal, oval, circular, etc. Such structures may contain from about 400-900 or more gas inlet openings (i.e., cells) per square inch of cross section (62-140 cells/cm$^2$).

The ceramic substrate may be made of any suitable refractory material, e.g., cordierite, cordierite-alumina, silicon nitride, zircon mullite, spodumene, alumina-silica magnesia, zircon silicate, sillimanite, a magnesium silicate, zircon, petalite, alumina, an aluminosilicate and the like. The substrates useful for the catalyst composite of the present invention may also be metallic in nature and be composed of one or more metals or metal alloys. The metallic substrates may be employed in various shapes such as corrugated sheet or monolithic form. Preferred metallic supports include the heat resistant metals and metal alloys such as titanium and stainless steel as well as other alloys in which iron is a substantial or major component. Such alloys may contain one or more of nickel, chromium, and/or aluminum, and the total amount of these metals may advantageously comprise at least about 15 wt % of the alloy, e.g., about 10-25 wt % of chromium, about 3-8 wt % of aluminum and up to about 20 wt % of nickel. The alloys may also contain small or trace amounts of one or more other metals such as manganese, copper, vanadium, titanium and the like. The surface of the metal substrates may be oxidized at high temperatures, e.g., about 1000° C. and higher, to improve the resistance to corrosion of the alloys by forming an oxide layer on the surfaces of the substrates. Such high temperature-induced oxidation may enhance the adherence of the refractory metal oxide support and catalytically promoting metal components to the substrate.

The substrate may also be a honeycomb wall-flow filter. Wall-flow substrates useful for supporting the coating compositions have a plurality of fine, substantially parallel gas flow passages extending along the longitudinal axis of the substrate. Typically, each passage is blocked at one end of the substrate body, with alternate passages blocked at opposite end-faces. Specific wall-flow substrates for use in the inventive process include thin porous walled honeycombs (monoliths) through which the fluid stream passes without causing too great an increase in back pressure or pressure drop across the article. Normally, the presence of a clean wall-flow article will create a back pressure of 0.036 psi to 10 psi. These ceramic wall-flow substrates may be made of any suitable refractory material, e.g., cordierite, cordierite-alumina, silicon nitride, zircon mullite, spodumene, alumina-silica magnesia, zircon silicate, sillimanite, a magnesium silicate, zircon, petalite, alumina, an aluminosilicate and the like. They are preferably formed of a material having a porosity of at least 40% (e.g., from 40 to 70%) having a mean pore size of at least 5 microns (e.g., from 5 to 30 microns). More preferably, the substrates have a porosity of at least 46% and have a mean pore size of at least 10 microns. When substrates with these porosities and these mean pore sizes are coated with a washcoat, adequate levels of the coating compositions can be loaded onto and/or into the pores of the substrates to achieve excellent pollutant conversion efficiency and burning off soot. These substrates are still able to retain adequate exhaust flow characteristics, i.e., acceptable back pressures, despite the catalyst loading. Suitable wall-flow substrates are for example disclosed in U.S. Pat. No. 4,329,162.

The expression "coating" is to be understood to mean the application of catalytically active materials and/or storage components on a substantially inert substrate which may be constructed in the manner of an above-described wall-flow filter or flow-through monolith. The coating performs the actual catalytic function and contains storage materials and/or catalytically active metals which are usually deposited in highly dispersed form on temperature-stable, large-surface-area metal oxides (see below). The coating is carried out usually by means of the application of a liquid coating medium of the storage materials and/or catalytically active components—also referred to as a washcoat—onto and/or into the wall of the inert substrate. After the application of the liquid coating medium, the support is dried and if appropriate calcined at elevated temperatures. The coating may be composed of one layer or constructed from a plurality of layers which are applied to a substrate one above the other (in multi-layer form) and/or offset with respect to one another (in zones).

The substrate is advantageously arranged on the coating device (122) in a liquid-tight manner, which can be achieved by means of at least one seal encompassing the substrate. The seal can be hollow and can be filled with gas or liquid as the substrate is mounted on or inserted into the coating device (122), and thus can form a leak tight closure, e.g. like mentioned in co-pending application EP14160879.4.

The liquid coating medium (113) is, for example, a suspension or dispersion for coating exhaust gas catalysts for motor vehicles ("washcoat") which contains catalytically active components or precursors thereof and inorganic oxides such as aluminum oxide, titanium dioxide, zirconium oxide or a combination thereof, it being possible for the oxides to be doped with silicon or lanthanum, for example. Oxides of vanadium, chromium, manganese, iron, cobalt, copper, zinc, nickel or rare earth metals such as lanthanum, cerium, praseodymium, neodymium, promethium, samarium, europium, gadolinium, terbium, dysprosium, holmium, erbium, thulium, ytterbium or combinations thereof can be used as catalytically active components. Noble metals such as platinum, palladium, gold, rhodium, iridium, osmium, ruthenium and combinations thereof can also be used as catalytically active components. These metals can also be present as alloys with one another or with other metals or as oxides. The metals can also be present as precursors, such as nitrates, sulfites or organyls of said noble metals and mixtures thereof, and, in particular, palladium nitrate, palladium sulfite, platinum nitrate, platinum sulfite or $Pt(NH_3)_4(NO_3)_2$ can be used in the liquid coating medium.

By calcination at about 400° C. to about 700° C., the catalytically active component can then be obtained from the precursor. To coat a substrate for the production of automotive exhaust gas catalysts, a suspension or dispersion of an inorganic oxide can initially be used for coating, after which, in a subsequent coating step, a suspension or dispersion which contains one or more catalytically active components can be applied. However, it is also possible for the liquid coating medium to contain both of these components. The liquid coating medium (slurry/washcoat) often has a solids content of between 35 and 52% and a viscosity of between 2 and 300 mPa*s, preferably 15-200 mPa*s.

The leak detection process according to the invention, which might preferably be performed before a new coating campaign is started or during a coating campaign from time to time, usually starts in that a certain coating slurry is pumped via direction (114) into the coating device (122) until the sensors (126) and (123) signal that the correct coating height is reached, i.e. the washcoat front is between both sensors. In the meantime a substrate (121) may be placed on the coating device (122) from above and tightly fixed (as described e.g. in DE102010007499A1, DE 102010008700A1 or Chinese utility model 201420126144.7). These cited publications are advantageously also part of this disclosure with respect of how a coating process can preferably be executed.

If being appropriately filled into the coating chamber (127) in the next step the front of the coating slurry (113) remains for a sufficient time between the respective sensors. If a leak is present, the washcoat front (130) will change over time and either sensor (123) will detect a contact or sensor (126) will lose its contact. If no leak exists, preferably the washcoat is pumped further into the substrate (121) until the desired coating height is reached (132).

Subsequently, surplus coating slurry is drawn off from the substrate (121) from below—e.g. through flap (440) in FIG. 5, and the substrate (121) may be coated again with the same washcoat or is released from the coating chamber and processed further, e.g. coated again from the other direction or even a second time with a different washcoat from the same direction, or progressed to the weighing, drying or calcining unit.

The finished substrates (i.e. coated and heat-treated or calcined substrates), which are suitable for the production of exhaust gas catalysts for motor vehicles, have a particularly uniform coating, which is characterized in that the coated length in the monolith differs from the optimal value by no more than 5 mm, in particular 3 mm, this applying to at least 95% of all the channels of a substrate, advantageously at least 99% of all the channels of a substrate, in particular 100% of all the channels. In this case, the coated length of the channels is less than the axial length L of the carrier. The uniform coating length has the advantage that in this way it is possible to introduce two coatings from the mutually opposite ends of the respective substrate without having too large a gap in between of them.

If these coatings are different and have to be separate from one another (e.g. because the coating components react with one another in an unwanted way or impair each other in their action), a spacing must be maintained and reliably be ensured between the two coatings. It is advantageous here if the coating length can be set as accurately and reliably as possible since, in this way, only a short length of the substrate has to be used for the spacing between the coatings, remaining uncoated and thus inoperative. It is thereby possible to achieve improved exhaust gas purification or to reduce the charging of the substrate with coating. Usually, with the present invention it is possible to minimize this gap to below 10, preferably below 6 and most preferably below 5 mm without taking the risk of both washcoats contacting each other in at least 95%, preferably more than 99% and most preferably 100% of the amount of coated monoliths.

BRIEF DESCRIPTION OF THE DRAWINGS

111 displacement body
112 tank
113 coating medium
114 line section
115 multiway valve
116 line section
117 filling flow direction
118 return flow direction to remove coating medium 113
119 discharge pump
120 connecting line leading to the reservoir for the coating medium
121 substrate
122 coating device
123 upper sensor for detecting the level 130
125 control unit
130 first washcoat level—of 113 in the coating device 122
132 second washcoat level—of 113 in the substrate 121
  FIG. 2 (example of prior art for coating a carrier):
200 actuator
201 piston
202 cylinder
203 liquid
204 connection
210 channels—in the substrate 221
211 displacement body
212 tank
213 coating medium
214 line section
215 multiway valve
216 line section
217 filling direction
218 extraction flow direction of 213
219 discharge and extraction pump
220 connecting line leading to the reservoir for excess coating medium 213
221 substrate
222 coating device
223 upper sensor for detecting the level 230
225 control unit
230 first washcoat level—of 213 in the coating device 222
232 second washcoat level—of 213 in the substrate 221
  FIG. 3:
300 substrate
301 end face
302 circumferential surface
303 first partial length zone
304 spacing—between the two partial lengths 303 and 305
305 second partial length zone
310 channels—in the substrate 300
330 first coating—in the channels 310
340 second coating—in the channels 310
L total length of the substrate 300
  FIG. 4 (partial picture taken from FIG. 1 showing upper and lower sensor arrangement for detecting leaks according to the invention):
  Numerals like FIG. 1
126 lower sensor
127 coating chamber
146A seal
146B discharge opening
  FIG. 5:
427 coating chamber
440 flap

DETAILED DESCRIPTION OF THE DRAWINGS

FIG. 1 shows an arrangement according to DE102010007499 for coating channels (110) in a substrate (121), which has a piston (101), actuated by an actuator (100), in a cylinder (102), which is filled with liquid (103) and, through a connection (104) of the cylinder (102) to the displacement body (111), allows the actuation of the displacement body (111) in the tank (112), which is filled with liquid coating medium (113) and has two line sections (114, 116) with an interposed multiway valve (115) between the tank (112) and the coating device (122), wherein the coating device (122) is provided with the substrate (121) and with sensors (123) for determining the first level (130). Additional sensors (124) are used to monitor the displacement volume of the coating medium (113) and the state of the displacement body (111) in the tank (112).

The values determined by the sensors (123, 124) are transmitted to a control unit (125) which, for its part, controls the actuator (100) and hence the piston (101).

On the one hand, the multiway valve (115) switches the filling of the coating device (122) with coating medium (113) up to the first level (130) in the filling flow direction (117) and, on the other hand, after the second level (132) in the substrate (121) is reached, switches, in the return flow direction (118), the connection to the discharge pump (119) and to the connecting line (120) leading to a storage tank for excess coating medium (113) and for holding it ready for further use.

All the control commands required for this purpose are preferably likewise output by the central control unit (125).

FIG. 2 shows an arrangement according to DE102010007499 for coating channels (210) in a substrate (221), which has a piston (201), actuated by an actuator (200), in a cylinder (202), which is filled with liquid (203) and, through a connection (204) of the cylinder (202), communicates with the tank (212), in which the displacement body (211) is situated, which contains liquid coating medium (213) and is connected via two line sections (214, 216) with an interposed multiway valve (215) to the coating device (222), which is provided with a substrate (221) and sensors (223) for determining the first level (230) of coating medium (213).

By means of the additional sensors (224) on the tank (212), the displacement volume of coating medium and the state of the displacement body (211) in the tank (212) are monitored. The values determined by the sensors (223, 224) are transmitted to a control unit (225) which, for its part, controls the actuator (200) and hence the piston (201).

On the one hand, the multiway valve (215) switches the filling of the coating device (222) with coating medium (213) up to the first level (230) in the filling flow direction (217) and, on the other hand, after the second level (232) in the substrate (221) is reached, switches, in the return flow direction (218), the connection to the discharge pump (219) and to the connecting line (220) leading to a storage tank for excess coating medium (213) and for holding it ready for further use. All the control commands required for this purpose are preferably likewise output by the central control unit (225).

Figures 3A, 3B:
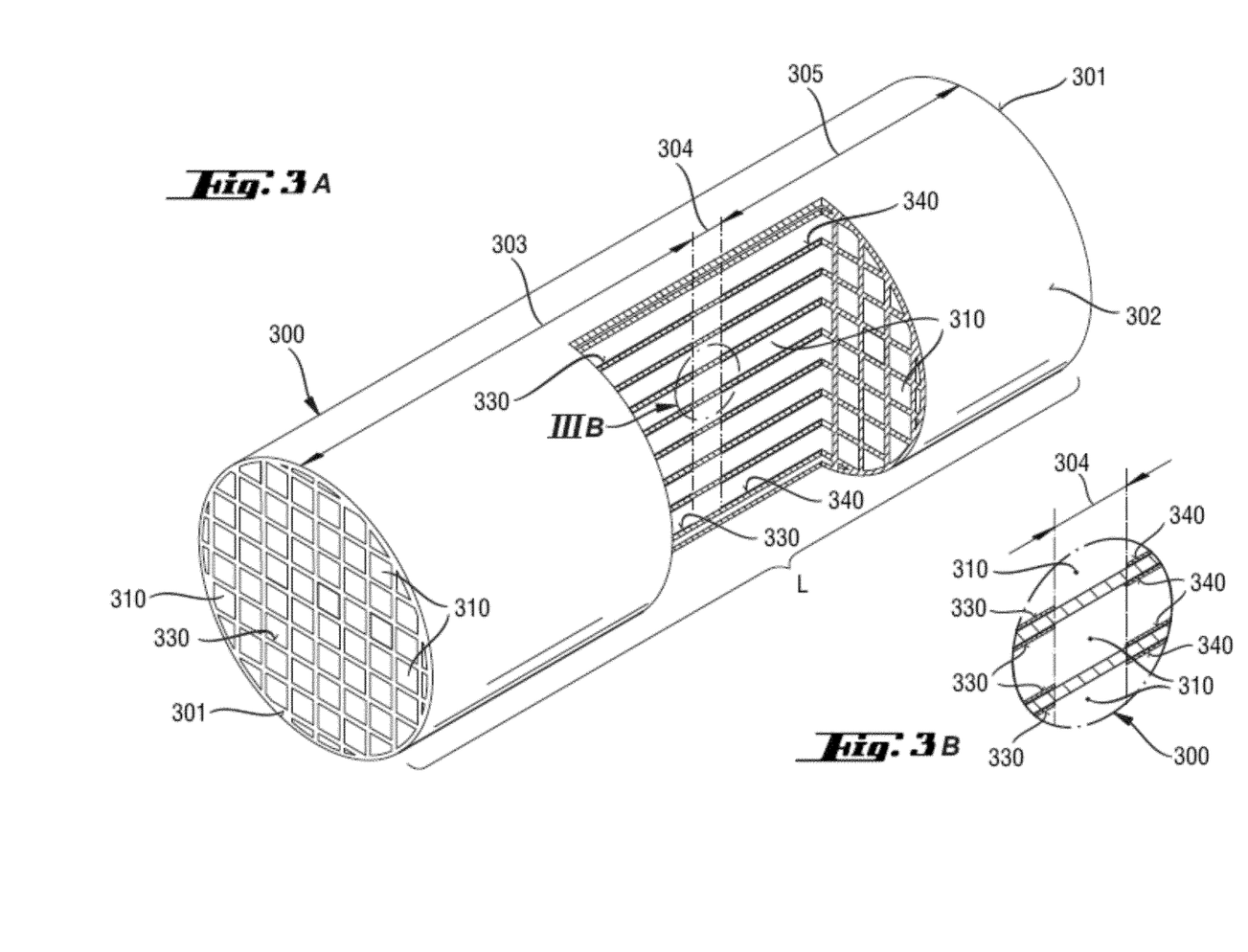

FIGS. 3A and 3B show in perspective a substrate (300), which has a section broken away in three planes in the central part thereof to make it possible to see into the coating structure according to the invention.

The substrate (300), which is coated in two partial length zones (303, 305), has two end faces (301), a circumferential surface (302) and a length (L) and is traversed by a multiplicity of channels (310) between the two end faces (301).

A first coating (330) is applied to a first partial length zone (303) in the channels (310), while a further partial length zone (305) is provided with a second coating (340).

Between the two partial length zones (303) and (305) or between the two coatings (330) and (340) there is a coating-free zone (304), as FIG. 3B, in particular, shows on an enlarged scale.

Figure 4:
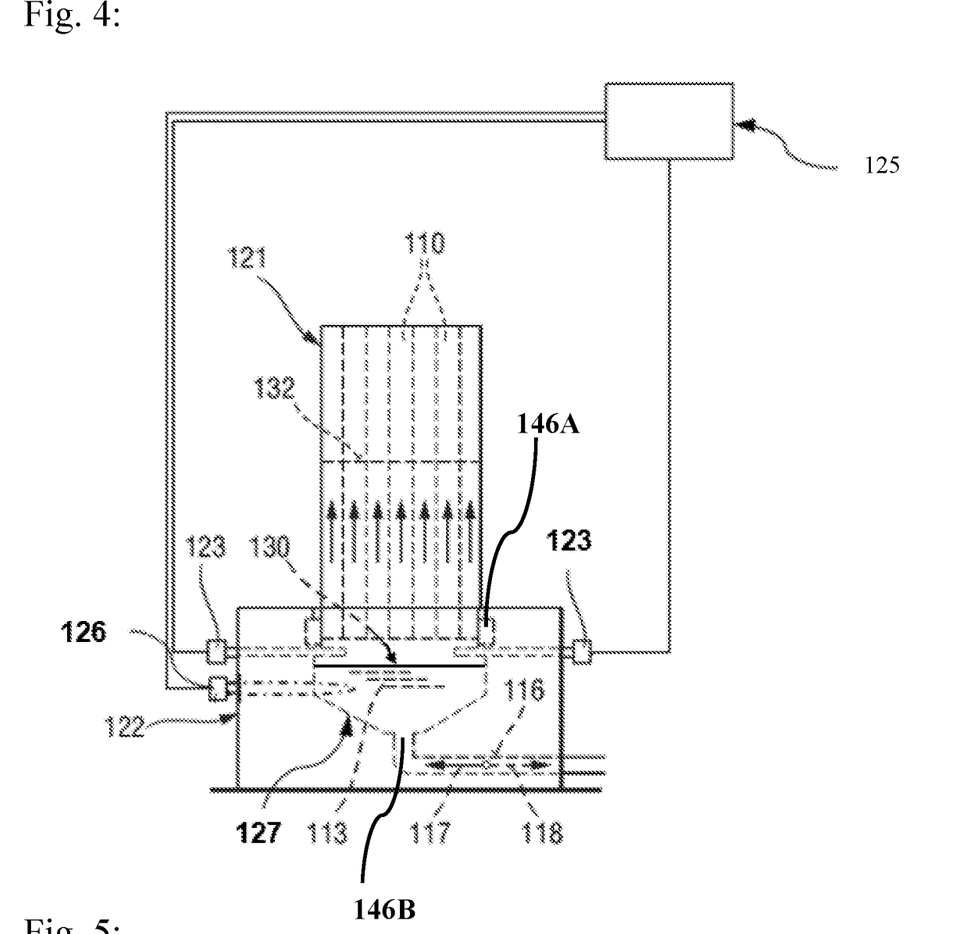

FIG. 4 shows an exemplary arrangement of the invention for coating channels (110) in a substrate (121). The liquid coating medium (113) is filled through line sections (116) into the coating apparatus (122), wherein the coating apparatus (122) is provided with the substrate (121) and with sensors (123, 126) for determining the first level (130) and its accuracy. The values determined by the sensors (via 123 and 126) are transmitted to a control unit (125) which, for its part, controls at least the further pumping or suction of the coating slurry based on the above-mentioned analysis. After being submitted into the coating chamber (127) the washcoat surface (130) lies between both sensors (123, 126). It is monitored whether this surface (130) migrates with time upwards or downwards as described above. The time needed to receive a signal from either sensor (126) or sensor (123) can relate to the magnitude of leakage present. As further seen in FIG. 4, the coating chamber comprises seal 146A at a first end and a discharge opening 146B at an opposite end, with the upper and lower sensors 123, 126 therebetween.

Figure 5:
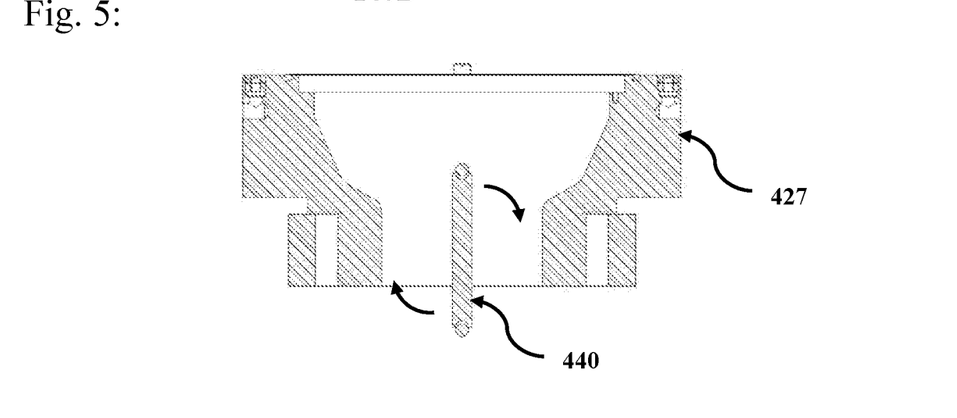

FIG. 5 shows a further arrangement to which the present invention can be applied advantageously. Displayed is a cross-section of a coating chamber (427) which comprises a different filling and emptying mechanism than presented in FIGS. 1 and 2, respectively. Here the filling of the coating chamber is done by lines approaching the chamber (427) at its side (not shown). Discharging the washcoat out of the chamber (427) is done through the flap (440) which disconnects the discharging line (not shown) to a sub-pressure tank (not shown).

Hence, with this invention in an initial trial before starting a new coating campaign or even during a running campaign an easy check can be made with regard to leak-tightness of the coating equipment used. This invention achieves a preferable coating result in a very easy but nonetheless surprisingly effective manner. In that at least two sensors are located in the coating chamber in an intelligent way it is possible not only to measure the level of the coating slurry directly in the coating chamber before coating begins to a more precise extent but one may, on the other hand, also determine whether a leak exists which would lead to false zone coated parts. The present invention greatly helps to avoid this and thus serves to have less coated monoliths falling out of specification. Hence, this invention allows to improve the economy of a process for coating exhaust catalysts. This was not made obvious from the prior art teaching at the date of this invention.

The invention claimed is:

1. A process for leak detection in a device used for production of automotive exhaust catalysts, the device comprising a coating chamber in which at least two sensors for measuring height of the washcoat are positioned at different levels within the coating chamber and which are connected to a controlling unit, comprising the steps of:

a) introducing washcoat into the coating chamber up to a fixed level between a lower sensor and an upper sensor of the at least two sensors for measuring the height of the washcoat;
b) waiting at least 5 s; and
c) analyzing whether the controlling unit signals that the washcoat level continues to increase and touches the upper sensor or signals if the contact to the lower sensor is lost.

2. The process according to claim 1, wherein, a time for waiting is more than 5 s but below 30 s.

3. The process according to claim 1, wherein, a conductivity sensor is used.

4. The process according to claim 1, wherein, the at least two sensors are positioned at a different height level distance of 20-1 mm within the coating chamber.

5. The process according to claim 1, wherein the time for waiting is more than 10 s but below 30 s.

6. The process according to claim 1, wherein the time for waiting is more than 10 s but below 20 s.

7. The process according to claim 1, wherein the coating chamber comprises a seal at a first end and a discharge opening at an opposite end, with the upper and lower sensors being in an intermediate height area between the first and opposite ends.

8. The process according to claim 1, wherein the at least two sensors are spaced apart at a different height level distance of 10- 1 mm within the coating chamber.

9. The process according to claim 1, wherein the at least two sensors are spaced apart at a different height level distance of 4-2 mm within the coating chamber.

10. The process according to claim 1, wherein the at least two sensors comprise the upper sensor, as a first upper sensor, and a second upper sensor, and wherein the first upper sensor and the second upper sensor are opposed upper sensors that are also spaced apart, in height, from the lower sensor by a distance of 10-1 mm within the coating chamber.

11. The process according to claim 1, wherein the controlling unit is configured to monitor an elapsed time before signal generation by the at least two sensors and to analyze the elapsed time to convey a magnitude of leakage in the device.

12. The process according to claim 1, wherein the coating chamber comprises a seal at a first end and an adjustable flap at an opposite end, with the at least two sensors being in an intermediate height area between the first and opposite ends, and the control unit is configured to determine leakage due to either or both of a seal leak and a flap leak.

13. The process according to claim 1, wherein, this process is performed before starting a new campaign for zone coating monoliths.

14. The process according to claim 13, wherein the new campaign for zone coating monoliths is a campaign directed at treating at least 500 monoliths.

15. The process according to claim 14, wherein the controlling unit is configured to carry out a process both prior to initiation of the new campaign and also at an intermediate point in the new campaign for zone coating monoliths.

* * * * *